(12) United States Patent
Bock et al.

(10) Patent No.: US 9,663,693 B2
(45) Date of Patent: May 30, 2017

(54) METHOD FOR PRODUCING MULTILAYER ABRASIVE PARTICLES

(71) Applicants: KLINGSPOR AG, Haiger (DE); FRAUNHOFER-GESELLSCHAFT ZUR FÖRDERUNG DER ANGEWANDTEN FORSCHUNG E.V., Munich (DE)

(72) Inventors: Irene Bock, Dillenburg (DE); Thomas Studnitzky, Dresden (DE); Thomas Kamps, Holzwickede (DE)

(73) Assignees: KLINGSPOR AG, Haiger (DE); FRAUNHOFER-GESELLSCHAFT ZUR FORDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 15/103,125

(22) PCT Filed: Dec. 17, 2014

(86) PCT No.: PCT/DE2014/100454
§ 371 (c)(1),
(2) Date: Jun. 9, 2016

(87) PCT Pub. No.: WO2015/090284
PCT Pub. Date: Jun. 25, 2015

(65) Prior Publication Data
US 2016/0304760 A1    Oct. 20, 2016

(30) Foreign Application Priority Data
Dec. 19, 2013    (DE) .......... 10 2013 114 492

(51) Int. Cl.
*B05D 1/38* (2006.01)
*C09K 3/14* (2006.01)
*B05D 7/00* (2006.01)

(52) U.S. Cl.
CPC .............. *C09K 3/1436* (2013.01); *B05D 7/50* (2013.01); *C09K 3/1409* (2013.01)

(58) Field of Classification Search
CPC ....... B05D 7/50; C09K 3/1436; C09K 3/1409
See application file for complete search history.

(56) References Cited

U.S. PATENT DOCUMENTS

| 2006/0042172 | A1 | 3/2006 | Sung | |
| 2010/0151201 | A1* | 6/2010 | Erickson | C09K 3/1409 428/148 |

(Continued)

OTHER PUBLICATIONS

PCT English Language Translation of the International Preliminary Report on Patentability, PCT/DE2014/100454, Jun. 30, 2016.

(Continued)

*Primary Examiner* — Nathan Empie
(74) *Attorney, Agent, or Firm* — Quarles & Brady LLP

(57) ABSTRACT

A method for producing multilayer abrasive particles (12) is proposed, comprising the following method steps:
providing a substrate support (01) and at least one dispersion of an abrasive particle precursor (05);
repeatedly positioning at least one grid structure (02) above the substrate support (01), covering areas (03) being defined by at least partially covered grid meshes (11) and printing areas (04) being defined by open grid meshes (11);
applying the at least one dispersion of an abrasive particle precursor (05) onto the grid structure (02), a contact being formed between the grid structure (02) and the substrate support (01) or layers (08) arranged on the substrate support (01), and a dispersion layer (07) being deposited (Continued)

in the printing areas (04) on the substrate support (01) or on the layers (08) previously arranged thereon when the contact is lifted, and subsequently drying each deposited dispersion layer (07) to form a layer (08).

7 Claims, 3 Drawing Sheets

(56) References Cited

U.S. PATENT DOCUMENTS

| | | |
|---|---|---|
| 2012/0167481 A1 | 7/2012 | Yener et al. |
| 2013/0180180 A1 | 7/2013 | Yener et al. |
| 2013/0236725 A1 | 9/2013 | Yener et al. |

OTHER PUBLICATIONS

International Search Report as mailed on Apr. 29, 2015 for International Application No. PCT/DE2014/100454.

\* cited by examiner

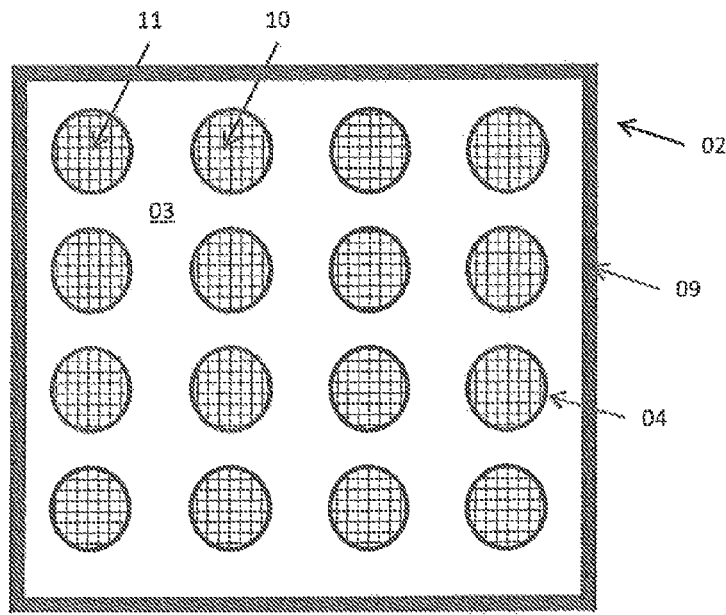
Fig. 2
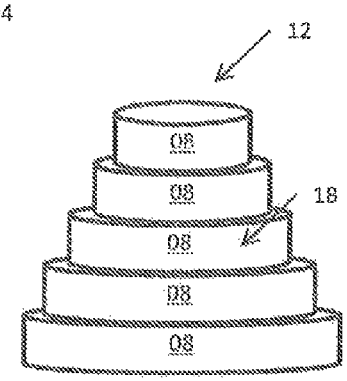
Fig. 3
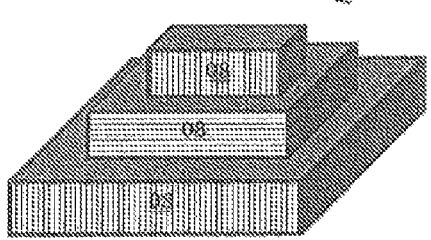
Fig. 4
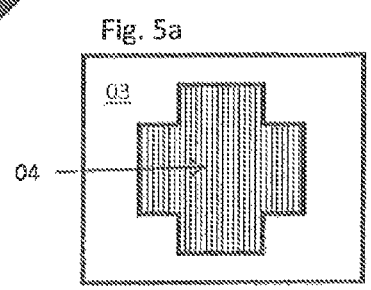
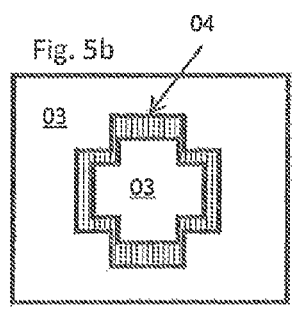
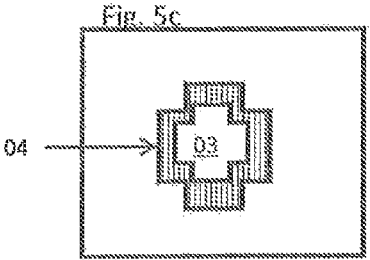
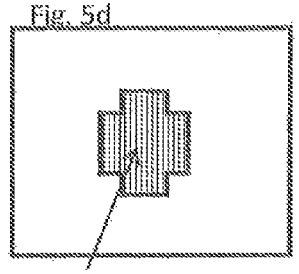

METHOD FOR PRODUCING MULTILAYER ABRASIVE PARTICLES

CROSS-REFERENCE TO RELATED APPLICATIONS

This application represents the national stage entry of PCT International Application No. PCT/DE2014/100454 filed Dec. 17, 2014 and claims priority to German Patent Application No. 10 2013 114 492.6 filed Dec. 19, 2013. The contents of this application are hereby incorporated by reference as if set forth in their entirety herein.

The present invention relates to a method for producing multilayer abrasive particles.

Abrasive particles are generally used to produce abrasives, by means of which in turn a material to be ground can be processed or ground. The abrasive particles can be ceramic abrasive particles, for example. Owing to their material properties, they exhibit particularly favorable abrasive properties. The aim of abrasive-particle production is to obtain particles that lead to a grinding performance or abrasive effect as constant and high as possible in a corresponding abrasive.

Different methods are known for producing abrasives that partially realize the properties mentioned above. For example, a method is known in which a large-scale or large-volume molded piece consisting of the material of the abrasive particles is produced and subsequently crushed in order to obtain the abrasive particles. However, methods of this kind are energy-consuming and lead to a wide distribution of resulting abrasive particles because the crushing process is only marginally or not at all selective. Consequently, the resulting abrasive particles have different sizes, different geometries and different other properties, too.

Another approach to producing abrasive particles is the extrusion of a molding compound or a dispersion of an abrasive particle precursor from an extrusion die. Likewise, methods are known in which a molding compound or dispersion of an abrasive particle precursor is mold-casted. There have been attempts before to produce multilayer abrasive particles by way of these methods. However, the methods known so far only allow relatively large structures in particular in terms of layer thicknesses in the range of a few millimeters per layer, which means that only very simple geometries of multilayer abrasive particles can be realized overall. However, they have not the desired positive properties mentioned above.

Therefore, the object of the present invention is to provide a method for producing multilayer abrasive particles that overcomes the disadvantages of the state of the art described above.

This object is attained by the inventive method according to claim 1. Advantageous embodiments of the method are the subject-matter of the dependent claims.

The basic idea of the present teaching in accordance with the invention is to use a grid structure having grid meshes for repeated application of a dispersion of an abrasive particle precursor. The grid structure has covering areas defined by at least partially covered grid meshes and printing areas defined by open grid meshes.

In detail, the method for producing multilayer abrasive particles comprises the following method steps:

First, a substrate support is provided, on which the abrasive particles are produced, that is, the individual layers of the abrasive particles are successively deposited or applied one on top of the other. Furthermore, the method comprises providing a dispersion of an abrasive particle precursor. A dispersion of an abrasive particle precursor can be any type of compound that is composed at least of the material of the abrasive particles to be produced or that can be transformed into said material and is suitable at least in terms of particle size and viscosity, but generally suitable overall for being applied onto a grid structure as described above. These compounds include sols of sol-gel systems.

A cycle or iteration of method steps of the method according to the invention that is at least repeated twice provides the steps of positioning a grid structure above the substrate support and applying or distributing the dispersion of an abrasive particle precursor onto the grid structure, a contact being formed between the grid structure and the substrate support or layers previously arranged on the substrate support, and a dispersion layer being deposited in the printing areas of the grid structure on the substrate support or on the layers previously arranged thereon when the contact is lifted, and each deposited dispersion layer being subsequently dried to form a layer.

In other words, this means that by applying the dispersion and forming and lifting the contact with the substrate support, a first dispersion layer is initially deposited or printed on the substrate support and dried to form a layer and that the same method steps are performed in further iterations, in which, however, the forming and lifting of the contact now takes place between the grid structure and the latest deposited or printed and dried layers.

However, drying in the sense of the invention is to be interpreted not only as a loss of fluids or solvent from the dispersion layer, but also as related or similar processes that lead to a mechanical or chemical stabilization of the dispersion layer.

There is basically no limit to the number of repetitions of the method steps. Afterwards, a final hardening process may follow, in which all layers of the multilayer abrasive particle are subjected to a corresponding hardening once more. The hardening process may be a sinter process, for example.

The special advantage of the method according to the invention is that the thus produced layers of the multilayer abrasive particles can be kept very low. In this way, previously unrealizable geometries of multilayer abrasive particles can be realized with the method. In particular, abrasive particles having a plurality of corners and edges with an angle of less than 90° can be produced. Furthermore, it is made possible to produce abrasive particles whose surface coming into contact with the material to be ground will remain as constant as possible during the grinding process despite the wear of the abrasive particles when the abrasive particles are used in an abrasive. Thus, very high-grade abrasive particles are achieved in terms of overall grinding performance and change of the grinding performance during grinding.

To find a balance for the different sizes of multilayer abrasive particles to be produced between the procedural effort, which is determined significantly by the number of layers, and the desired precision of the structures of multilayer abrasive particles, it is particularly desirable if each deposition produces layers having a layer thickness of 10 to 500 μm, in particular layers having a layer thickness of 20 to 250 μm.

In general, a plurality of materials for the production of abrasive particles are known that have favorable characteristics in terms of their properties and are also available in large quantities and with consistent quality. The materials can be in the form of pasty ceramic compounds, sol-gel systems and in the form of abrasive grits. Silicon carbide, zirconia alumina, fused aluminum oxide and semi-friable aluminum oxide are known abrasive grits, for example. It is particularly advantageous if abrasive grits of this kind are also used in the proposed method, which is achieved, for example, in that the step of providing at least one dispersion of an abrasive particle precursor comprises adding abrasive grit. In this case, the step of providing the dispersion can additionally comprise providing binders or activators which allow embedding into the multilayer abrasive particles to be produced in the course of the drying of the layers or the final sintering.

Dispersions of an abrasive particle precursor that undergo a sol-gel conversion are particularly suitable for use in the method according to the invention. Sol-gel systems of this kind are characterized in that a so-called sol is provided in the initial state, physical and/or chemical bridges being formed in the sol during a maturation process until the internal cross-linking reaches a state in which the sol or the liquid converts to a gel state, which is generally defined by a ratio between the mechanical storage modulus and the loss modulus. Systems of this kind are particularly suitable for the method according to the invention owing to, among other things, their easily controllable and sometimes relatively fast conversion between the sol state and the gel state, because these characteristics allow achieving a quick conversion from the dispersion layer into a layer that can be printed on again. In this case, the drying of the dispersion layer can be realized not only but predominantly in the cross-linking of the sol and the resulting mechanical stabilization. However, a loss of solvent from the dispersion layer can greatly contribute to the drying and mechanical stabilization of the dispersion layer in this case as well. Accordingly, a particularly preferred embodiment provides that the step of providing at least one dispersion of an abrasive particle precursor comprises producing a sol of a sol-gel system.

Alternatively, pasty compounds can also be used as a dispersion of an abrasive particle precursor, which may be provided with corresponding hinders and thus also undergo the corresponding drying, in which the reactions of the binder can contribute to the drying of the dispersion layer and its mechanical stabilization.

In known abrasives, so-called abrasive substances can be contained in or introduced into the abrasives in addition to abrasive particles. Abrasive substances are materials that positively influence the grinding process when coming into contact with the abrasive particles and/or the material to be ground. Cryolite and pyrite are examples of abrasive substances. However, the known methods for producing abrasives allow the abrasive substances to be arranged only in a relatively large spatial distance from the abrasive particles, which means that the action or effectiveness of the abrasive substances cannot be fully exploited. Hence, it is desirable to arrange the abrasive substances as closely to the abrasive particles as possible or to integrate them into the abrasive particles themselves. Consequently, it is particularly desirable for the method according to the invention that the step of providing a dispersion of an abrasive particle precursor envisages adding abrasive substances.

As described above, the method according to the invention allows special geometries of the resulting abrasive particles owing to the low thickness of each layer of the multilayer abrasive particles. This potential can be fully exploited in particular if the grid structures used for depositing each dispersion layer have different printing and covering areas, the printing areas of two successively used grid structures overlapping at least in sections. Such a sequence of used grid structures allows realizing an almost unlimited number of three-dimensional geometries for the multilayer abrasive particles. The fact that the printing areas of successively used grid structures overlap in sections ensures that each subsequently deposited dispersion layer finds sufficient adhesion, support and contact surface on the previously formed layer.

Another significant improvement of the resulting multilayer abrasive particles is achieved if different dispersions are used in each application of the dispersion onto a grid structure. It may be provided that, both, grid structures having identical printing and covering areas and grid structures having different printing and covering areas are used with different dispersions of abrasive particle precursors in each case. For instance, an alternating sequence of layers of two or more different layer materials and corresponding dispersions of the abrasive particle precursors is contemplated. On the other hand, however, individual layers or a plurality of adjacent layers of one material are contemplated as well, which are different from the material of the other layers and thus also in terms of the dispersion of the abrasive parade precursor used for producing the respective layer.

As mentioned above, it is especially desirable for abrasive particles in general if the surface of the abrasive particle coming into contact with the material to be ground during the grinding process does not change much despite wear and abrasion of the abrasive particle. Moreover, edges or surfaces of abrasive particles that form smallest possible spatial angles are desirable as well. In consequence, hollow bodies are particularly suitable as abrasive particles overall because in case of a shell of the hollow body having an almost consistent thickness, i.e. wall or shell thickness, the attacking surface or the surface being in contact during grinding stays largely the same. Moreover, when the hollow space enclosed by the hollow body opens and the abrasive particle continues to be abraded, the attacking surfaces of the shell have relatively few spatial angles that become larger during the grinding process. Thus, in a particularly advantageously manner, the method according to the invention is designed so that a hollow body having a shell made of layers and a hollow space enclosed by the shell is produced.

In a particularly advantageous manner, a hollow body is produced by the method according to the invention if at least three deposition processes of layers or dispersion layers are performed, at least the grid structure used in the second deposition process having covering areas that are each completely surrounded by a printing area.

It may further be advantageous if conversely, independently of the number of layers or the number of deposition processes, the first and last grid structures used therein have printing areas that are each completely surrounded by a covering area. A deposition of this kind of at least the first and last layers or dispersion layers can be understood as producing or providing a bottom and a top, respectively, of the hollow-body multilayer abrasive particle.

Between, these at least two finishing layers, a plurality of other layers may be arranged, which are produced using grid structures in which covering areas are completely surrounded by printing areas so as to produce the corresponding shell structures in the direction of the respective layer thickness, i.e. perpendicularly to the substrate support. To achieve an especially efficient production of multilayer abrasive particles, it is particularly advantageous if the substrate support is transported in a transport system, such as a revolving transport system, and if the transport system comprises a plurality of processing or depositing stations, a grid structure being arranged above the substrate support at the at least one depositing station or at the plurality of depositing stations. Additionally, a transport system of this kind can also comprise processing stations at which the drying of the dispersion layers into layers takes place or is promoted. In a revolving transport system, it may additionally be envisaged that the multilayer abrasive particles are removed from the substrate support between a final processing station and a first processing station.

Individual embodiments and aspects of the method according to the invention will be illustrated hereinafter as examples by way of merely schematic drawings. In the drawings:

FIGS. 1a)-g) show a schematized illustration of individual method steps of the method according to the invention and schematic illustrations of the grid structures used therein;

FIG. 2 shows a schematic illustration of an exemplary grid structure;

FIG. 3 shows a schematic illustration of a first embodiment of a multilayer abrasive particle produced by means of the method according to the invention;

FIG. 4 shows a schematic illustration of a second embodiment of a multilayer abrasive particle produced by means of the method according to the invention;

Figure 6:
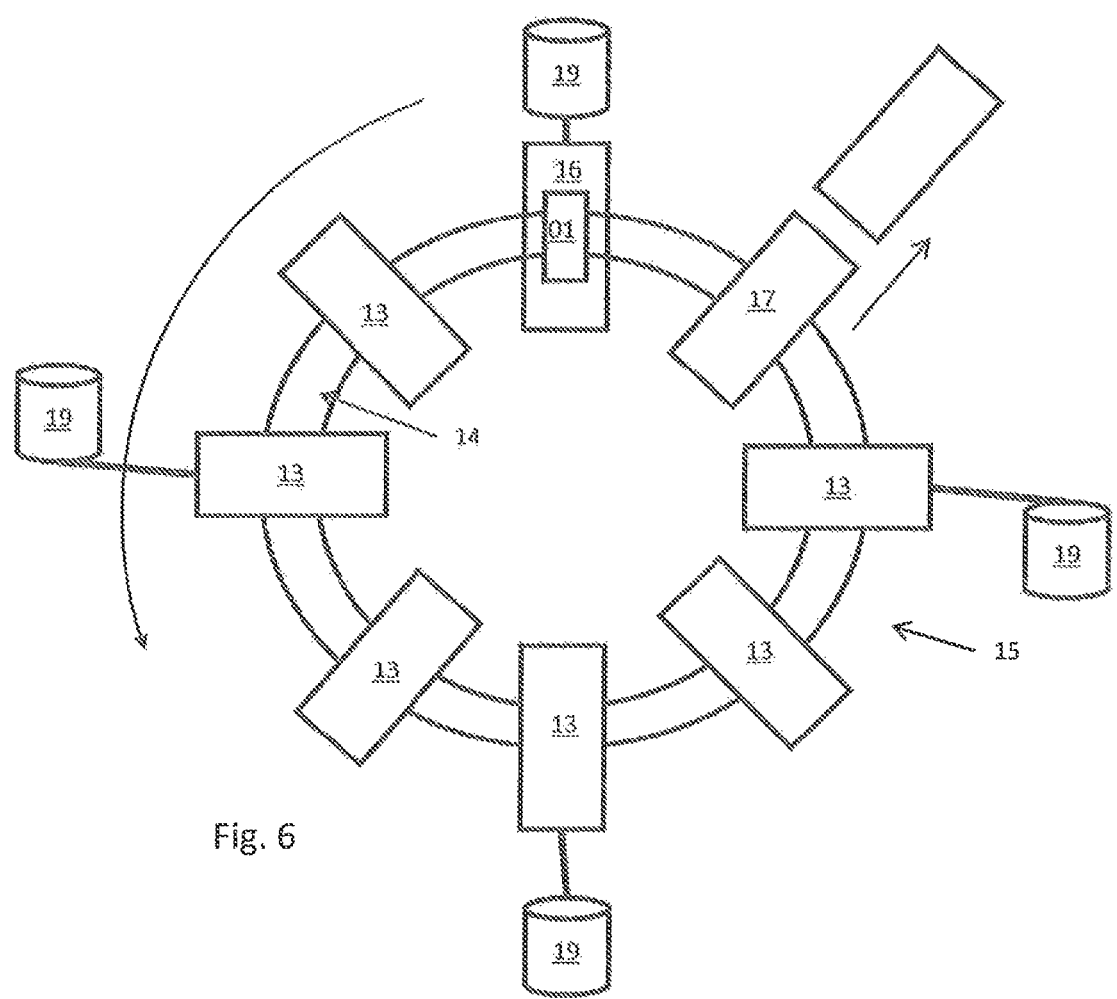

FIGS. 5a)-d) show a schematic illustration of a sequence of grid structures for producing a hollow-body multilayer abrasive particle by means of the method according to the invention; and FIG. 6 shows a schematic illustration of a device for implementing the method according to the invention.

FIG. 1a) shows a lateral view of a substrate support 01 and a lateral view of a grid structure 02 arranged above the substrate support 01. Aside from the lateral view, the grid structure 02 is also illustrated in a top view. In the top view of the grid structure 02, a covering area 03 and a printing area 04 surrounded by the covering area 03 are illustrated. However, the top view of the grid structure 02 serves as an example and is thus illustrated in significantly simplified form. Instead of a single printing area 04 and a covering area 03 surrounding the same, a plurality of printing areas 04 arranged in rows and columns and covering areas 03 surrounding the same and possibly being conflated into one whole covering area may be provided. Thus, a corresponding number of individual abrasive particles and layers for their production may be formed by means of a correspondingly large grid structure.

FIG. 1a) also illustrates a dispersion of an abrasive particle precursor 05, which is arranged on the grid structure 02. The dispersion of the abrasive particle precursor 05 is distributed along the grid structure 02 or applied to the grid structure by means of a scraper 06, which is indicated by the first movement of the scraper 06 along arrow P depicted in FIG. 1a), said arrow showing the general direction of movement of the scraper 06.

In an optional method step illustrated in FIG. 1b), the scraper 06 can move in such a manner at first that the lower edge of the scraper 06 has a small distance to the grid structure 02, a uniformly thick layer of the dispersion of an abrasive particle precursor 05 thus being formed on the grid structure 02.

During the subsequent motion of the scraper 06, as illustrated in FIG. 1c), a downward force is also generated in the direction of the substrate support 01 so that a contact is formed between the grid structure 02 and the substrate support 01 when distributing the dispersion 05 or applying the dispersion 05 onto the grid structure 02. In this state, the dispersion 05 can be transferred or applied to the substrate support 01 in the printing area(s) 04. Owing to the adhesion between the substrate support 01 and the dispersion 05 or between the already present layer 08 and the dispersion 05 and owing to the inertia of the dispersion 05 it may be achieved that the dispersion of an abrasive particle precursor 05 transferred or applied to the substrate in the printing area 04 remains on the substrate support 01 when the contact between the substrate support 01 and the grid structure 02 is lifted. Once the contact between the grid structure 02 and the substrate support 01 has been lifted, the dispersion can flow into the space deserted by the grid structure 02 so that no imprint of the grid structure stays behind.

Figure 1:
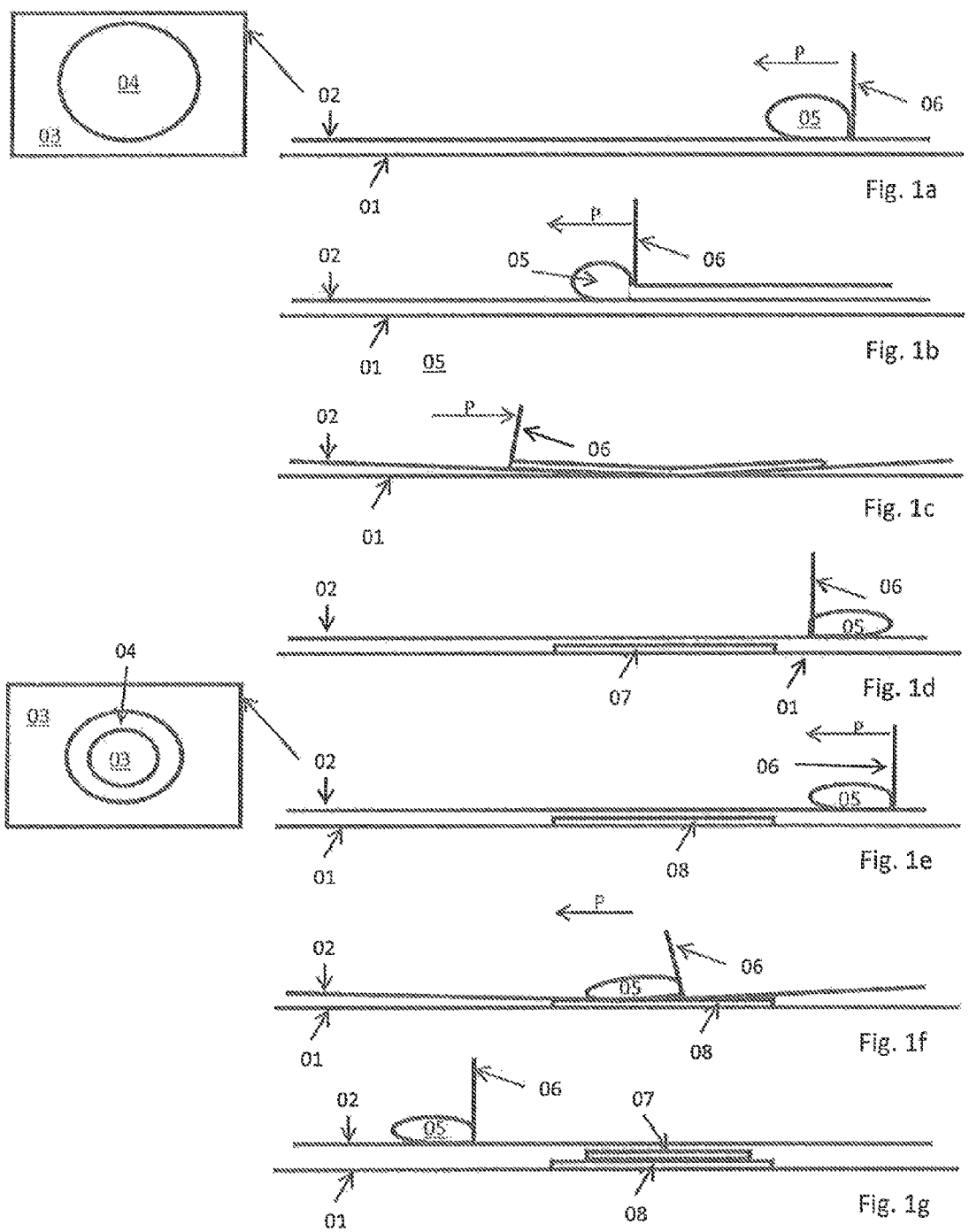

FIG. 1d) shows the state in which the scraper 06 has almost reached the opposite part of the grid structure 02 as compared to FIG. 1 and the grid structure 02 is no longer in contact with the substrate support 01. Following the application or distribution of the dispersion 05 across the grid structure 02, a first dispersion layer 07 has formed on the substrate support 01 in the area of the printing area 04 of the grid structure 02. In the state illustrated in FIG. 1d), the dispersion layer 07 can have a layer thickness of 50 µm, for example. The layer thickness is influenced by different parameters, which include the scraper speed of the scraper 06 and the scraper geometry, the pressure generated during contact between the substrate support 01 and the grid structure 02, and especially also the composition of the dispersion of the abrasive particle precursor 05. The rheology of the dispersion 05 plays a significant role, too. For example, sols of a ceramic sol-gel system are particularly preferred that exhibit a thixotropic shear behavior and a zero shear viscosity in the range of about 10-5,000 Pas in the state in which they are applied or distributed onto the grid structure.

The method step illustrated in FIG. 1d) is followed by a drying step, by means of which the dispersion layer 07 is formed into a layer, i.e. into a layer of an abrasive particle. The drying itself is highly dependent on the dispersion 05 used. For example, a sol-gel conversion can be brought about. Alternatively or additionally, the extraction of solvent can be caused or, in general, cross-linking of the individual particles of the dispersion 05 can be expedited through chemically or physically caused cross-linking or bridging. The drying has to be performed at least to a degree in which the forming layer 08 stays largely dimensionally stable against the forces occurring when a grid structure 02 is brought into contact with the layer 08 and in which the layer 08 ultimately also retains its shape under the weight of other layers 08 or dispersion layers 07 arranged on the layer 08.

As illustrated in FIG. 1e), the grid structure 02 is subsequently replaced. The grid structure 02 now arranged above the substrate support and the first layer 08 has a first covering area 03, which is completely surrounded by a printing area 04. The printing area 04 itself is in turn completely surrounded by a second covering area 03. It becomes apparent that a circular ring is deposited or printed by means of the grid structure 02 in a method whose method steps largely correspond to the process of FIGS. 1a to 1d. In the case of FIG. 1e, the scraper is moved in the reverse direction to distribute or apply the dispersion 05 on the grid structure.

In correspondence to FIG. 1c, FIG. 1f) shows the process of contacting and of lifting the contact between the grid structure; however, in the illustration of FIG. 1f), the contact between the first layer 08 and the grid structure 02 is formed or lifted. Also, the uniform layer of the dispersion of an abrasive particle precursor 05 initially formed on the grid structure 02 in FIG. 1b) is not illustrated, which, does not mean, however, that this optional method step cannot also have taken place prior to contacting and lifting of the contact according to the illustration of FIG. 1f).

Correspondingly, in FIG. 1g), a second dispersion layer 07 is deposited or arranged on the first layer 08, which is again subjected to corresponding drying.

The process of FIGS. 1a) to 1g) can be repeated with correspondingly different grid structures 02 to produce a corresponding multilayer abrasive particle. Based on the grid structures 02 illustrated in FIGS. 1a) and 1e), it is contemplated, for example, that a multilayer abrasive particle in the form of a hollow body is produced, which comprises a stepped structure and substantially approximates the shape of a hollow cone.

As becomes apparent, from FIG. 1, almost any kind of geometry of multilayer abrasive particles and in particular of hollow-body multilayer abrasive particles can be produced by means of the described method.

FIG. 2 schematically shows a grid structure 02 being used in the method according to the invention. The grid structure 02 has a frame 09, which serves to fix a grid of corresponding grid threads 10. Thus, corresponding grid meshes 11 are formed between the grid threads 10. For example, the grid threads can have a thickness of 30 μm and the distances between the grid threads cart be about 70 μm. In FIG. 2, a further material layer is arranged on the grid formed by the grid threads, said material layer covering or filling the grid threads in sections. This layer thus forms the covering areas 03, that is, a continuous covering area 03 in the case of FIG. 2. Said continuous covering area 03 surrounds a plurality of circular printing areas 04, which are arranged in rows and columns in the form of a matrix. However, a different arrangement is also contemplated, in particular an arrangement that allows a maximum number of printing areas.

FIG. 3 shows an example of a multilayer abrasive particle 12 comprising the layers 08. FIG. 3 is a multilayer abrasive body in the shape of an approximated cone, which can be produced when using the grid structures 02 of FIGS. 1 and 2, for example. At the same time, however, it is also possible that the multilayer abrasive particle 12 shown in FIG. 3 is produced solely from grid structures 02 as those shown in FIG. 2. In other words, the multilayer abrasive particle 12 of FIG. 3 can also be designed as a solid cone instead of a hollow cone. In case of a hollow cone, the layers 08 enclose a hollow space 18 arranged within.

In FIG. 4, a multilayer abrasive particle 12 is illustrated that is based on a variation of the method according to the invention, which provides that different dispersions of a particle precursor are used in different processes of applying and printing layers 08. This is indicated in FIG. 4 by the different shadings of the layers 08. The example of FIG. 4 shows an alternating sequence of layers. However, other sequences of layers with more than two different dispersions of a particle precursor and/or other sequences are contemplated as well.

In FIGS. 5a) to 5d), FIG. 5 shows an example of a sequence of grid structures 02 that can be used in the method according to the invention to produce a hollow-body multilayer abrasive particle.

FIG. 5a) shows a grid structure having a printing area 04 in the shape of a cross and a covering area 03 completely surrounding the printing area.

FIG. 5b) shows a grid structure in which a first covering area 03 is completely surrounded by a printing area 04, the printing area 04 being arranged in such a manner that it is arranged on the printing area 04 of FIG. 5a) at least in sections. Additionally, the first covering area 03 and the printing area 04 of the grid structure of FIG. 5b) are cross-shaped as well. In consequence, a cross is formed as a dispersion layer or as a layer after subsequent drying, which has the shape of the edges of a cross, when the method according to the invention is implemented using the grid structure of FIG. 5b).

FIG. 5c) substantially corresponds to the grid structure of FIG. 5b) in terms of the arrangement of the covering areas 03 and of the printing area 04, both the cross of the first or inner covering area 03 and the cross of the printing area 04 being smaller than in FIG. 5b). At the same time, however, the printing area 04 of the grid structure of FIG. 5c) is arranged at least in sections above the layer that is formed when the method according to the invention is implemented using the grid structure of FIG. 5b). In this way, it is made possible that the dispersion layer can be achieved on the dried layer formed by using the grid structure of FIG. 5b) when the dispersion is applied using the grid structure 02 of FIG. 5c).

FIG. 5d) shows a grid structure 02 having only one printing area 04 in the shape of a cross and a covering area 03 completely surrounding the printing area 04. The grid structure of FIG. 5d) thus allows closing the hollow body formed by using the grid structure of FIGS. 5a) to 5c). Accordingly, the exemplary use of the grid structures of FIGS. 5a) to 5d) results in a pyramid-shaped hollow-body multilayer abrasive particle having the basic shape of a cross.

A particular advantage of the claimed method is that the dispersions of abrasive particle precursors 05 used in the course of the method can also be designed as overhangs or as surfaces that can be printed over and that do not need to be supported by the substrate support 01 or by another layer to a certain degree without substantial deformation of the dispersion layer 07 or of the layer occurring in the overhanging area while the dispersion layer 07 is converted into a layer 08. Thus, the method according to the invention can also be implemented in such a manner that the grid structures of FIG. 5 are used in a sequence starting with FIG. 5d) and ending with FIG. 5a).

FIG. 6 shows an example of a revolving transport system 15 for implementing the method according to the invention. The revolving transport system comprises a plurality of processing stations 13, which are connected to one another by a corresponding transport means 14 for transporting substrate supports 01. As schematically illustrated in FIG. 6, storage devices 19 can be arranged at different processing stations, which ensure the storage of dispersions of particle precursors 05. The substrate support 01 is transported in the revolving transport system 15 of FIG. 6 from a first processing-station 16 along the arrow through the corresponding processing stations 13 until it arrives at the final processing station 17. At this processing station, the resulting multilayer abrasive particles are removed and potentially cleaned before the substrate support 01 is returned to the first processing station 16 by the transport means 14.

In a revolving transport system 15 as the one illustrated in FIG. 6, it is of course sensible for reasons of economy of procedure to provide not only one substrate support 01, but at least as many substrate supports as there are processing stations. This may be advantageous if drying takes place in the processing stations 13, which do not have a storage device 19 for a dispersion of a particle precursor 05, meaning that no application of dispersion can take place at these processing stations 13. However, in the case that drying of the dispersion layers takes place outside of or between individual processing stations 13, it may alternatively even be advantageous to provide multiple substrate supports 01 as processing stations 13. Thus, drying of the dispersion layers can take place between each of the processing stations 13 and a new application or deposition of a dispersion layer can take place at another or next processing station 13.

The invention claimed is:

1. A method for producing multilayer abrasive particles, said method comprising:
   providing a substrate support and at least one dispersion of an abrasive particle precursor;
   positioning at least one grid structure above the substrate support, said at least one grid structure covering areas being defined by at least partially covered grid meshes and printing areas being defined by open grid meshes;
   applying the at least one dispersion onto the grid structure to form a contact between the grid structure and the substrate support or layers arranged on the substrate support;
   depositing a dispersion layer in the printing areas on the substrate support or on the layers previously arranged on the substrate support when the contact is lifted; and
   subsequently drying each deposited dispersion layer to form a layer, wherein closed hollow bodies each having a shell made of layers and a hollow space enclosed by the shell are produced, and a grid structure whose covering areas are each completely surrounded by a printing area is used in at least one depositing process, and grid structures whose printing areas are each completely surrounded by a cover area are used in a first and in a last depositing process.

2. The method according to claim 1, in which the deposition produces layers having a layer thickness of 10 to 500 µm.

3. The method according to claim 1, in which the step of providing at least one dispersion of an abrasive particle precursor includes adding abrasive grit.

4. The method according to claim 1, in which the step of providing at least one dispersion of an abrasive particle precursor includes producing a sol of a sol-gel system.

5. The method according to claim 1, in which the step of providing at least one dispersion of an abrasive particle precursor includes adding abrasive substances.

6. The method according to claim 1, in which different dispersions are used for the application step.

7. The method according to claim 6, in which two different dispersions are applied alternately.

* * * * *

UNITED STATES PATENT AND TRADEMARK OFFICE
CERTIFICATE OF CORRECTION

PATENT NO. : 9,663,693 B2  
APPLICATION NO. : 15/103125  
DATED : May 30, 2017  
INVENTOR(S) : Irene Bock et al.

It is certified that error appears in the above-identified patent and that said Letters Patent is hereby corrected as shown below:

In the Specification

Column 2, Line 56: "the structures" should be --fine structures--

Column 3, Line 38: "hinders" should be --binders--

Column 4, Line 21: "parade" should be --particle--

Column 7, Line 24: "cart" should be --can--

Signed and Sealed this  
Fifteenth Day of August, 2017

Joseph Matal  
*Performing the Functions and Duties of the*  
*Under Secretary of Commerce for Intellectual Property and*  
*Director of the United States Patent and Trademark Office*